J. VON DER KAMMER.
METABOLIZER.
APPLICATION FILED DEC. 23, 1909.

987,805.

Patented Mar. 28, 1911.
9 SHEETS—SHEET 2.

J. VON DER KAMMER.
METABOLIZER.
APPLICATION FILED DEC. 23, 1909.

987,805.

Patented Mar. 28, 1911.
9 SHEETS—SHEET 3.

UNITED STATES PATENT OFFICE.

JOHN VON DER KAMMER, OF WASHINGTON, DISTRICT OF COLUMBIA.

METABOLIZER.

987,805.  Specification of Letters Patent.  Patented Mar. 28, 1911.

Application filed December 23, 1909. Serial No. 534,727.

*To all whom it may concern:*

Be it known that I, JOHN VON DER KAMMER, a citizen of the United States, residing at Washington, District of Columbia, have invented certain new and useful Improvements in Metabolizers, of which the following is a specification.

This invention relates to improvements in metabolizers for carrying out substantially the plan for the metabolism of grains and other vegetable seeds set forth in the U. S. Patent No. 891,176, granted to me June 16, 1908.

The invention, therefore, consists in the structure substantially as set forth in the following description and claims.

A set of drawings accompanies this description and forms a part of the specification.

In these drawings.

As in the structure of my patent above mentioned, so in the present structure, a number of metabolizer units or cells are built up in tiers and each cell constitutes an anaerobic chamber. These chambers all intercommunicate for the equalization and free circulation of the anaerobic atmosphere. These tiers of cells are inclosed by an outer wall or jacket and space is left between the cell walls and the jacket for the free circulation of the confined atmosphere whereby an even temperature may be more readily maintained and to assist in this a heating means is added to the tiers of cells within the inclosure. In the drawings the inclosing jacket is represented at 16. It may be of any suitable material and construction to produce an air-tight inclosure. Within this inclosure and preferably at each end is a tier of the metabolizer units 17. Between these tiers is the middle chamber 18, the lateral confines of which are formed by the stanchions 19. These stanchions also form the inner boundary of the lateral chambers containing said tiers of units or cells. In these stanchions and the corresponding ones 20 in the walls of the jacket are located the transverse rods 21, which form supports for the cells 17. The middle chamber is provided with a door as at 22, a rear wall 23 and with a heating or temperature regulating coil 24. A thermometer is also provided for the metabolizer and is preferably located in the door of the middle chamber as indicated at 25.

Figure 5:
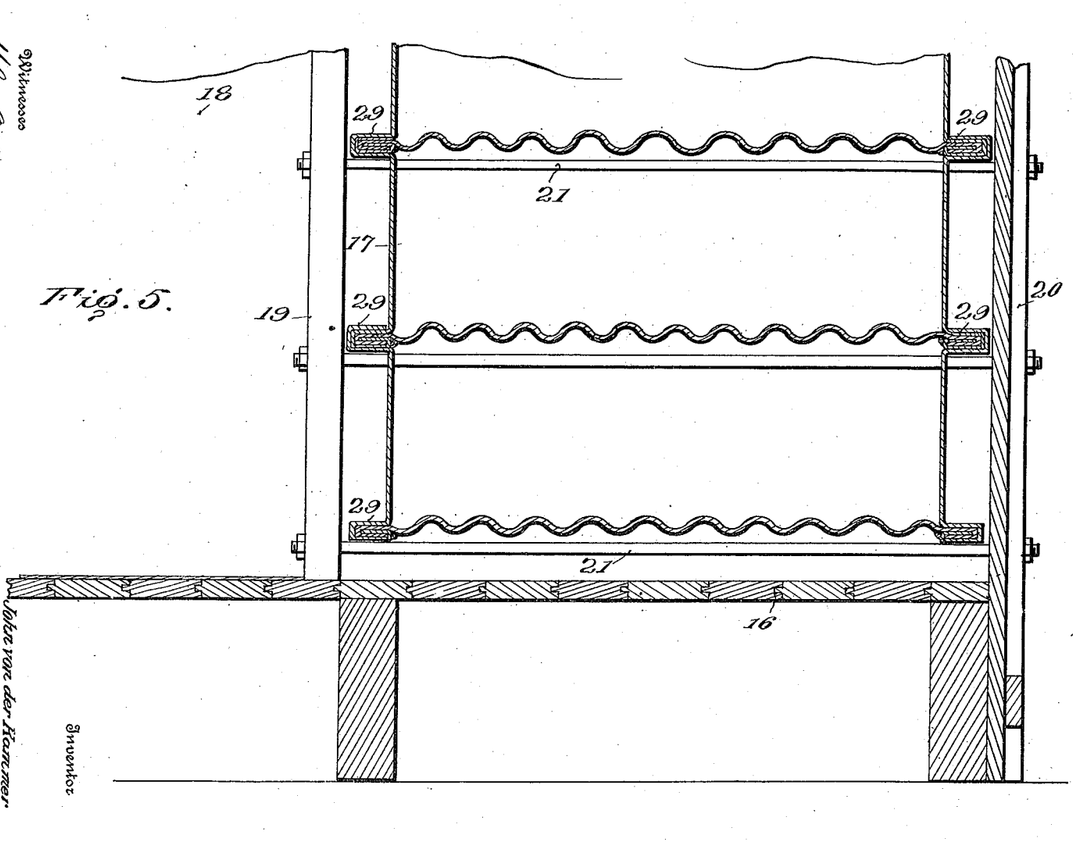
Fig. 5 is a transverse vertical section through one of the side chambers of the metabolizer taken in the plane indicated by the line 5—5 Fig. 9.
Figures 9, 10:
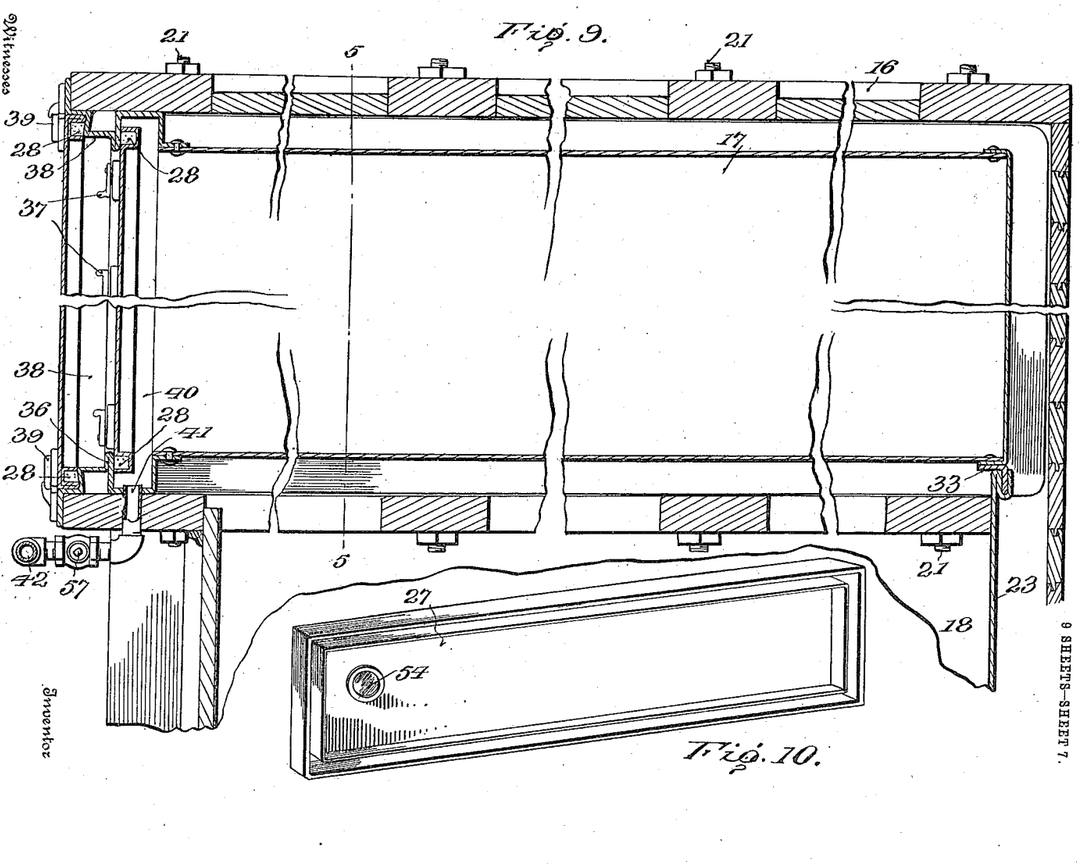
Fig. 9 shows on an enlarged scale a portion of the section represented in Fig. 4.
Fig. 10 is a perspective view of one of the outer cell doors.
Figures 11, 12:
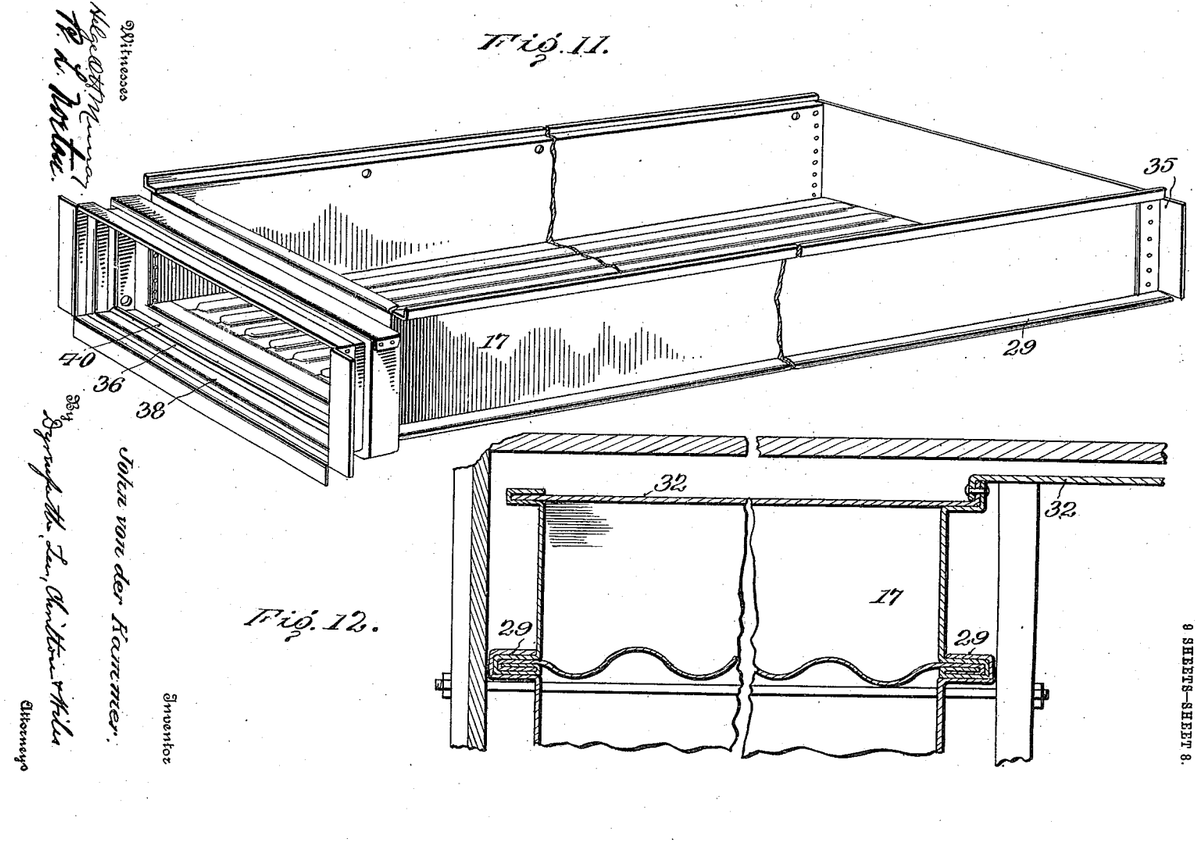
Fig. 11 shows in perspective certain details of construction of one of the cells of the metabolizer.
Fig. 12 is a detail view in vertical transverse section through the upper portion of one of the side chambers.
Figure 13:
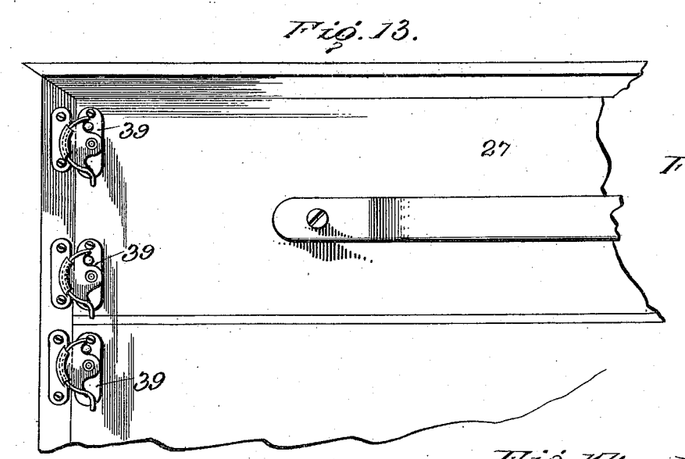
Fig. 13 shows, in elevation, the manner of securing in place the outer cell doors.
Figure 14:
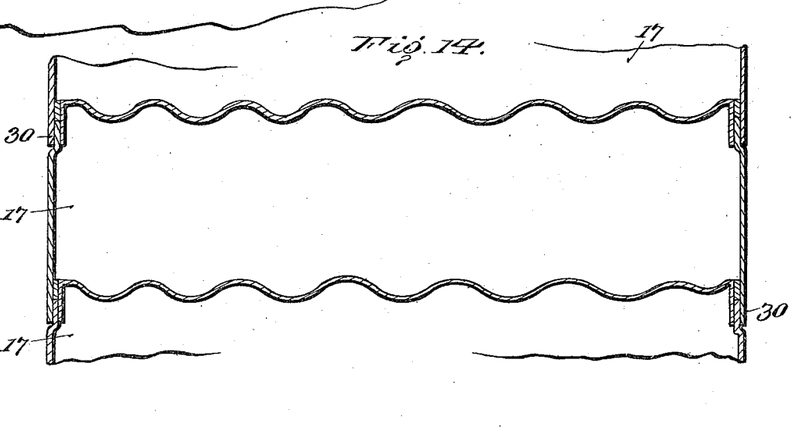
Fig. 14, shows a modification in the manner of building up one of the tier of cells.
Figure 15:
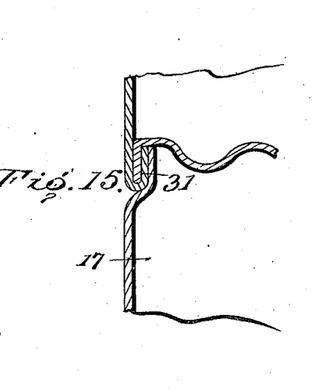
Fig. 15 is a detail showing a modification in the formation of the joints of the edges of the cells.

The cells 17 are made of sheet metal and after the manner indicated in Fig. 11. They have corrugated bottoms and are also preferably inclined toward the front and there provided with an inner door 26 and an outer door 27. Both of these doors are made to fit their jambs in an air-tight and water-tight manner. To this end, they are provided with channels at their edges, Figs. 8 and 10 respectively, in which suitable packing 28 may be retained. The inner door 26 performs principally the function of a dam and therefore is provided with packing at only the side and bottom edges. The sides and bottom of each cell are joined together by interfolding their meeting edges as indicated at 29 Figs. 5, 6 and 12, and they may be joined as indicated at 30 in Fig. 14, and at 31 in Fig. 15. At their side and rear ends the cells are joined together in the tiers also by folding the edges of an under cell over the bead or projection formed by the aforesaid interfolded edges of sides and bottoms. This is clearly shown also at 29 in Figs. 5, 6 and 12. The top of one cell is formed by the bottom of the next cell till the top of the tier is reached where the uppermost cell is provided with a cover 32, Figs. 2 and 12. Angle irons 33 are riveted to the rear corners of the cells, Figs. 9 and 12, and to these the rear wall 23 of the middle chamber is joined by folding the edges thereof around the projecting web of said angle iron. The top of the middle chamber is joined to the upper edges of the topmost cells of the two tiers as seen in Fig. 12. The sides of the cells are perforated as seen at 34 Fig. 6, for the circulation of the anaerobic atmosphere. The forward end of each cell is provided with a corrugated or ribbed collar to which the sides of the cells are riveted and to which the bottom is joined by hooked folds 35, Figs. 2 and 6. These collars are fitted to one another on upper and lower sides and joined together by the outer lower edge of an upper collar being folded over the upper edge of the adjacent lower collar. The bead 36 of each collar serves as the stop for the inner door 26 and against this stop the lever clamps 37 Fig. 8, engage for holding said door tightly in place. The bead 38 serves as the stop for the outer door 27 and against it this door is tightly held by the arc clamps 39, Fig. 13. The depression 40 in each collar serves as a trough or drainage channel. Each of these channels 40 has a nipple 41, Fig. 9, attached thereto and these nipples connect with stand-pipes 42 and 43 which serve both as supply and drainage pipes for the cells. The nutritive or inoculating mixture or solution may be fed through these pipes from a tank as 44, preferably located upon the metabolizer, or through said stand-pipes gas or other prepared atmosphere may be supplied by branch pipes 45 or 46. The culture or other solutions or mixtures above referred to may be supplied to the tank 44 in any suitable way as by the funnel 47. The pipes 45 and 46 may also be used for supplying hot and cold water which may be commingled to obtain the desired temperature and then be admitted to tank 44 through either cross-over pipe 48 or 49, or such tempered water may be admitted to the cells of the metabolizer through the stand-pipes 42 or 43 or both, these pipes and all the others being provided with valves or cocks, as shown, whereby to determine and regulate the flow of gas, water or other liquid to and from the metabolizer. A thermometer as 50 may be provided in the connection between the stand-pipes to show the temperature of the fluid supplied to the cells, and a gage glass 51 may be attached to the tank 44 to show the height and condition of liquid therein.

Figure 1:
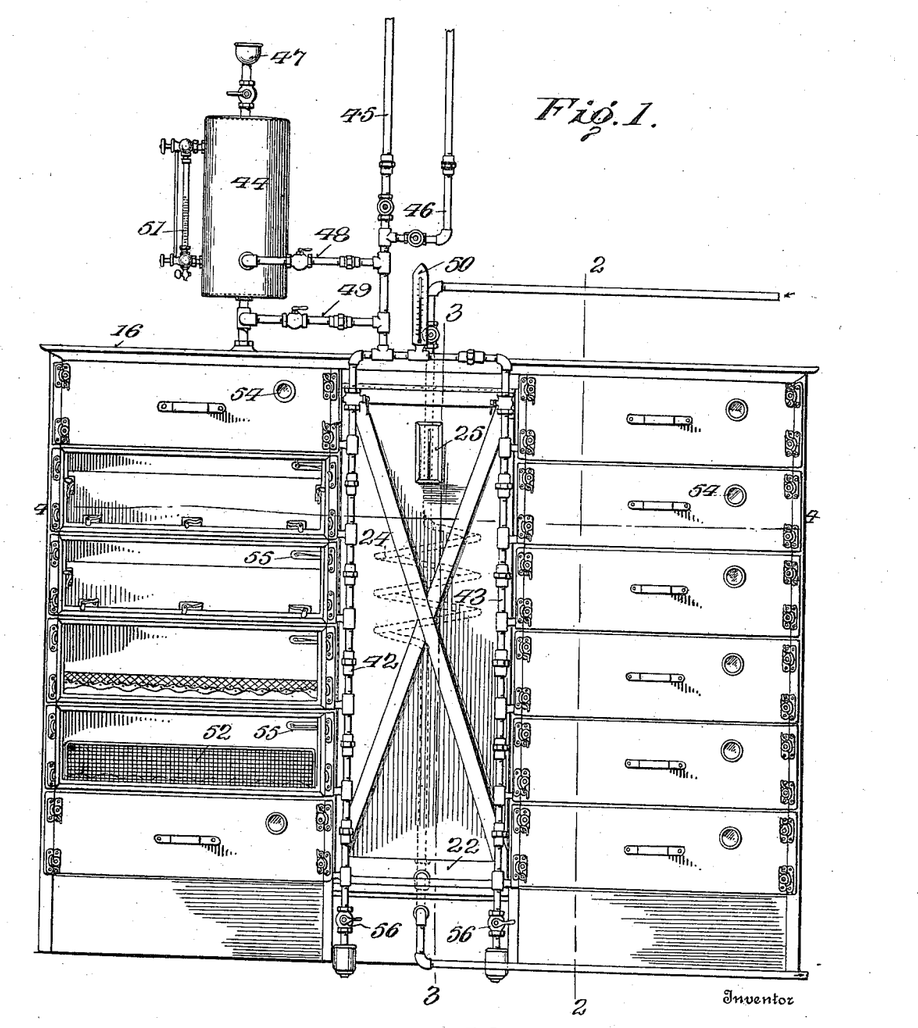
Figure 1 is a front elevation of the improved metabolizer.
Figure 2:
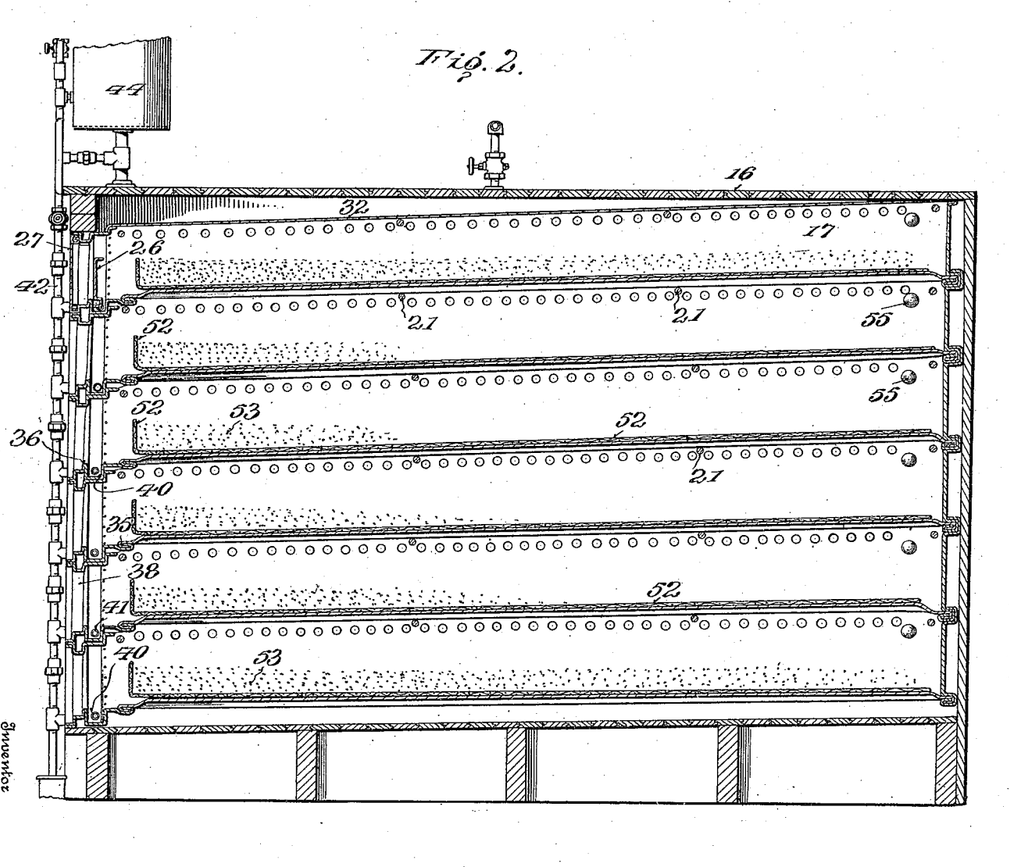
Fig. 2 is a vertical section through one of the side chambers and is taken in the plane indicated by line 2—2, Fig. 1.
Figure 3:
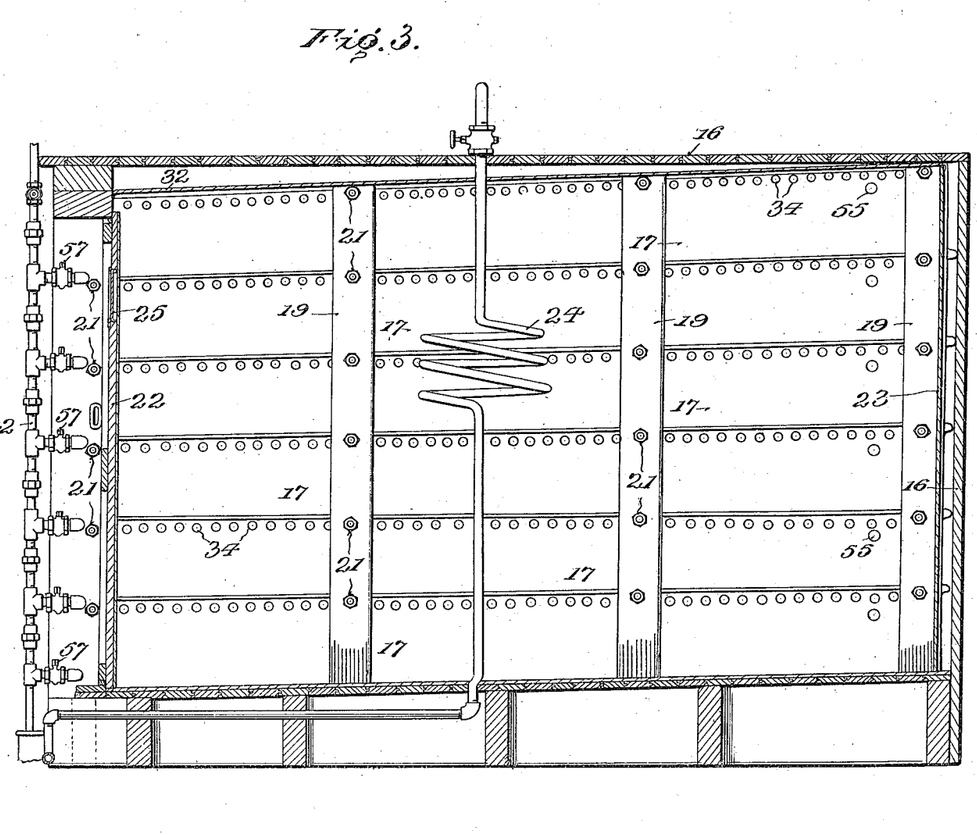
Fig. 3 is a similar section through the middle chamber of the metabolizer taken in the plane indicated by the line 3—3, Fig. 1.
Figure 4:
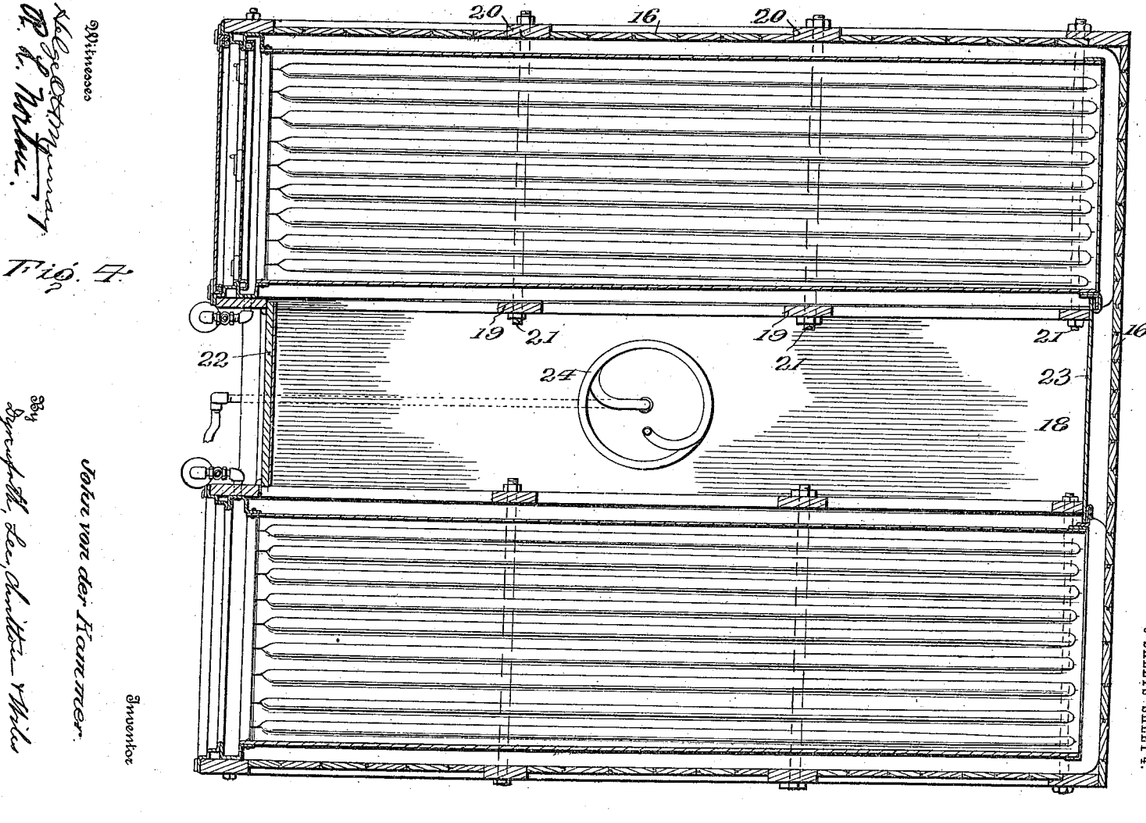
Fig. 4 is a horizontal section taken in the plane indicated by the line 4—4, Fig. 1.
Figures 6, 7, 8:
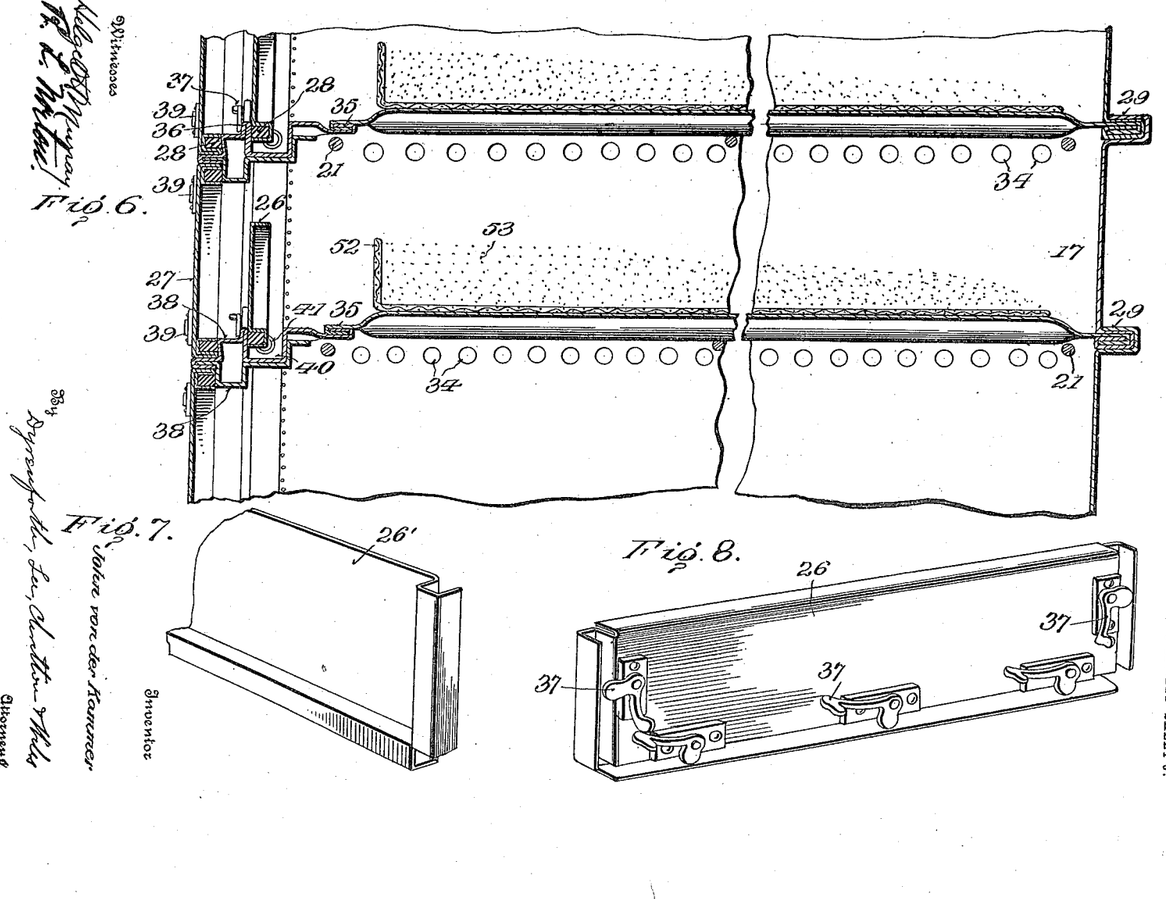
Fig. 6 shows on an enlarged scale a portion of the section represented in Fig. 2.
Fig. 7 is a detail of one mode of formation for the inner cell doors.
Fig. 8 shows, in perspective, the preferred form of inner cell door.

The grain or other seeds to be treated in the metabolizer are placed therein, preferably on reticulated or wire net trays as illustrated at 52, which have the outer end turned up to retain the contents, which is illustrated at 53 Figs. 2 and 6 by dots. After the trays have been loaded and put into place, the inner doors 26 are applied and clamped into place and then the outer doors 27 are put up and clamped to their stops. The desired solutions are then supplied to the cells through the piping system described. They enter through the nipples 41 and rise up through the contents of the trays 52, this progress being aided by the corrugation in the bottom of the trays. The rise of the water to the desired height may be ascertained in any suitable way. As shown in the drawings it may be ascertained, and the condition of each cell may be inspected, through the window 54 placed preferably in the door 27, the cells being lighted up for inspection, as by electric lamps 55 placed near their rear ends. As will be noticed the windows 54 look over the tops of the doors 26 and the front wall of the trays 52. After the cells have been flooded sufficiently to give the grain or seeds the desired bath, the water or solution, as the case may be, can be drawn off by opening the cocks 56 at the lower end of the stand-pipes, the volume of flow into and out of the cells being regulated by the cocks 57, Figs. 3 and 9, in the nipples 41. Likewise, by these cocks is determined the number of cells to be used simultaneously and the amount of liquid to be admitted to each cell and the amount to be retained therein.

The metabolizer described is also adapted for the treatment of tubers, roots or bulbs as well as grain or other seeds.

The invention claimed is:—

1. In a metabolizer, the combination with an outer wall or jacket, of a series of liquid holding cells therein, each provided with apertures in its sides for the circulation of the anaerobic atmosphere of the metabolizer.

2. In a metabolizer, the combination with an outer wall or jacket, of a series of liquid holding cells therein, each provided with apertures in its sides for the circulation of the anaerobic atmosphere of the metabolizer, and each cell having its bottom joined to the sides by an infolding seam projecting to the jacket.

3. In a metabolizer, a series or tier of cells each having its bottom joined to the sides thereof by an infolding seam and each cell joined to the adjacent one by combining its upper edge with the said seam of the adjacent cell.

4. In a metabolizer, adjacent tiers of cells joined together but spaced apart to form an intermediate chamber, each cell being ventilated into said chamber, and a device in said chamber for regulating the temperature of the metabolizer.

5. In a metabolizer, the combination with an outer wall or jacket, of a tier of superimposed cells therein, stanchions within the metabolizer and in the wall thereof and cross rods located in said stanchions and passing under the cells for supporting them.

6. A metabolizer unit or cell having in its outer end a ribbed or channeled collar, an outer door fitted to said collar for closing the cell and an inner door removably fitted in a water-tight manner to a stop or bead in said collar.

7. A metabolizer unit or cell having at its outer end a ribbed or channeled collar, and a bottom sloping toward said collar and terminating at a channel thereof, a nipple fitted to said channel, a dam at the outer side of said channel and a closure for the cell at the outer end of said collar.

8. A metabolizer unit or cell having a door at its outer end and a corrugated bottom sloping toward the door, a removable dam fitted across the cell adjacent to the foot of the slope, means at the foot of said slope for the admission or withdrawal of fluids, and a recticulated tray constructed to rest upon the ribs of the corrugated bottom.

9. A metabolizer unit or cell having a dam near its outer end, a door closing said outer end, a window in said door overlooking the dam, and a lamp within the cell for the purpose specified.

10. In a metabolizer, a series or tier of cells each having its bottom inclined toward the front, a stand-pipe, nipples connecting the lowermost portion of each cell to said pipe, a cock in each nipple, and a source of fluid supply connected to said stand-pipe whereby the cells may be supplied with fluid at will.

11. A metabolizer cell having a beaded collar at its outer end one of which beads forms a door stop, a sheet-metal door whose edges are pressed into channels which open at the inner face of the door, a packing fitted to said channels in a manner to engage said stop, and clamps for tightening said door with its packing against said stop.

12. A metabolizer cell having a forwardly sloping bottom and having a stop bead at the bottom and sides of the cell adjacent to the foot of said slope, a removable dam having a channel on its face extending along its bottom and ends, a packing in said channel to engage said stop bead, and clamps mounted on the face of the door and adapted to engage the opposite side of said stop to tighten the door thereagainst.

In testimony whereof I affix my signature in presence of two witnesses.

JOHN VON DER KAMMER.

Witnesses:
FRANCIS M. PHELPS,
GEO. S. LIVINGSTON.

---

Copies of this patent may be obtained for five cents each, by addressing the "Commissioner of Patents, Washington, D. C."